US012511969B1

(12) United States Patent
McGrath et al.

(10) Patent No.: US 12,511,969 B1
(45) Date of Patent: Dec. 30, 2025

(54) DOCUMENT RECOGNITION DEVICE

(71) Applicant: THE GOVERNOR & COMPANY OF THE BANK OF ENGLAND, London (GB)

(72) Inventors: Anthony McGrath, Loughton (GB); Richard Noble, Norwich (GB); Charles Noble, Stamford (GB)

(73) Assignee: THE GOVERNOR & COMPANY OF THE BANK OF ENGLAND, London (GB)

( * ) Notice: Subject to any disclaimer, the term of this patent is extended or adjusted under 35 U.S.C. 154(b) by 0 days.

(21) Appl. No.: 18/837,853

(22) PCT Filed: Feb. 3, 2023

(86) PCT No.: PCT/GB2023/050246
§ 371 (c)(1),
(2) Date: Aug. 12, 2024

(87) PCT Pub. No.: WO2023/156756
PCT Pub. Date: Aug. 24, 2023

(30) Foreign Application Priority Data

Feb. 21, 2022 (GB) .................. 2202327

(51) Int. Cl.
*G07D 7/04* (2016.01)
*G01R 33/00* (2006.01)

(52) U.S. Cl.
CPC ........... *G07D 7/04* (2013.01); *G01R 33/0094* (2013.01)

(58) Field of Classification Search
CPC .................. G07D 7/04; G01R 33/0094
USPC ........................................... 235/449
See application file for complete search history.

(56) References Cited

U.S. PATENT DOCUMENTS

| 2012/0275644 A1 | 11/2012 | Kasuya et al. |
| 2013/0127457 A1 | 5/2013 | Musha et al. |
| 2015/0261981 A1 | 9/2015 | Ogomi et al. |
| 2017/0371005 A1 | 12/2017 | Xue et al. |
| 2019/0347889 A1 | 11/2019 | Feulner et al. |

FOREIGN PATENT DOCUMENTS

| EP | 1353302 A2 | 10/2003 |
| EP | 3399504 A1 | 11/2018 |
| KR | 20140095219 A | 8/2014 |

*Primary Examiner* — Daniel A Hess
(74) *Attorney, Agent, or Firm* — SZDC Law PC

(57) ABSTRACT

A document recognition device comprising a magnetic field sensor (22) responsive to a controller (34) to acquire magnetic field data from a document of value (18), wherein the magnetic field sensor (22) comprises a plurality of sensor elements (28) having a node spacing and the controller (34) is configured to periodically activate the magnetic field sensor (22) to acquire magnetic field data at regularly spaced intervals along a document of value, the spacing between each interval corresponding to the node spacing of the sensor elements (28) and the magnetic field sensor entering an inactive state between successive intervals. The sensor elements (28) are arranged as a linear array orientated perpendicular to a direction of travel of the document of value (18) over the magnetic field sensor (22). A method of document authentication is also provided.

16 Claims, 3 Drawing Sheets

60

DOCUMENT RECOGNITION DEVICE

This application is the National Stage Application of PCT/GB2023/050246, filed on Feb. 3, 2023, which claims priority to United Kingdom Patent Application No. 2202327.9, filed on Feb. 21, 2022, which is incorporated by reference for all purposes as if fully set forth herein.

FIELD OF THE INVENTION

The present invention relates to document recognition devices and in particular devices for analysing images used for determining authenticity of a document of value such as a banknote.

BACKGROUND TO THE INVENTION

Document recognition devices used for determining authenticity of documents of value such as banknotes, bonds, card-like media and the like are arranged to automatically detect features on the documents as they are passed at speed through the device. Sensors generate data which is used to assess features on the documents of value and to reject the documents of value where the image data is not consistent with an authentic document.

Accuracy during operation of such recognition devices is important to ensure authentic documents of value are not rejected and that fake documents of value are not accepted as valid.

SUMMARY OF THE INVENTION

In accordance with a first aspect of the invention, there is provided a document recognition device comprising a magnetic field sensor responsive to a controller, such as an FPGA, to acquire magnetic field data from a document of value, wherein the magnetic field sensor comprises a plurality of sensor elements having a node spacing and the controller is configured to periodically activate the magnetic field sensor to acquire magnetic field data at regularly spaced intervals along a document of value, the spacing between each interval corresponding to the node spacing of the sensor elements and the magnetic field sensor entering an inactive state between successive activations. The node spacing defines the distance between successive adjoining sensor elements and as the spacing between each interval and the node spacing are the same, each sensor element effectively acquires data over a succession of contiguous square regions aligned along a direction of travel of a document of value with respect to the magnetic field sensor.

The plurality of sensor elements are preferably arranged as a linear array orientated perpendicular to a direction of travel of the document of value over the magnetic field sensor. Preferably the node spacing is a constant value such that the sensor elements are regularly spaced apart.

The document recognition device may further comprise a housing, the magnetic field sensor located on an external face of the housing so as to allow notes to pass over the magnetic field sensor without entering the housing.

Preferably the plurality of sensor elements are split into a plurality of equal groups, typically four groups, and the controller is configured to process in parallel data acquired from each of the groups. This allows more rapid processing of magnetic field data.

The device may further comprise an edge recognition sensor, typically an optical sensor, configured to trigger the commencement of acquisition of magnetic field data when the edge of a document of value is sensed.

The controller is preferably a field programmable gate array (FPGA) to allow for parallel processing and storage of data.

Preferably the intervals are spaced apart by a distance of between 0.8 mm to 0.2 mm, the spacing of the intervals corresponding to the node spacing of the plurality of sensor elements. Thus the plurality of sensor elements preferably have a node spacing of 0.8 mm to 0.2 mm.

The sensor elements are preferably TMR elements.

The device preferably further comprises a speed input element in communication with the controller, thereby to determine speed of travel of a document of value and thus to determine the intervals at which the controller is required to activate the magnetic field sensor. The speed input element may be a speed sensor attached to a conveying machine through which a document of value is travelling or may be a calculated value stored within the controller and accessible by the controller to calculate when the magnetic field sensor is to be activated.

In accordance with a second aspect of the invention, there is provided a method of document authentication comprising passing a document of value over a magnetic field sensor responsive to a controller to acquire magnetic field data, the magnetic field sensor comprising a plurality of sensor elements having a node spacing, periodically activating the magnetic field sensor using the controller to acquire magnetic field data, wherein the controller is configured to periodically activate the magnetic field sensor to acquire magnetic field data at regularly spaced intervals along the document of value, the spacing between each interval corresponding to the node spacing of the sensor elements and the magnetic field sensor entering an inactive state between successive intervals. Thus magnetic field data can be acquired from adjoining contiguous segments of the document of value.

Preferably the plurality of sensor elements are arranged as a linear array orientated perpendicular to a direction of travel of a document of value over the magnetic field sensor.

The method may further comprise configuring the plurality of sensor elements as four sections and processing in parallel magnetic field data from each of the four sections. This improves the speed of data acquisition and thus the speed at which documents of value can be assessed for authenticity.

Preferably the method further comprises detecting an edge of a document of value using an edge detection sensor, such as an optical sensor, thereby to trigger activation of the magnetic field sensor.

The method may further comprise locating at least part of the magnetic field sensor externally on a housing such that the document of value is positionable external to the housing during acquisition of magnetic field data.

A field programmable gate array is preferably used to store magnetic field data, and in particular data representing location and characteristics of authentic magnetic features on a document of value.

The method may further comprise a calibration step, with a separate calibration applied to each sensor element.

The invention will now be described by way of example with reference to the accompanying drawings in which.

DESCRIPTION

Figure 1:
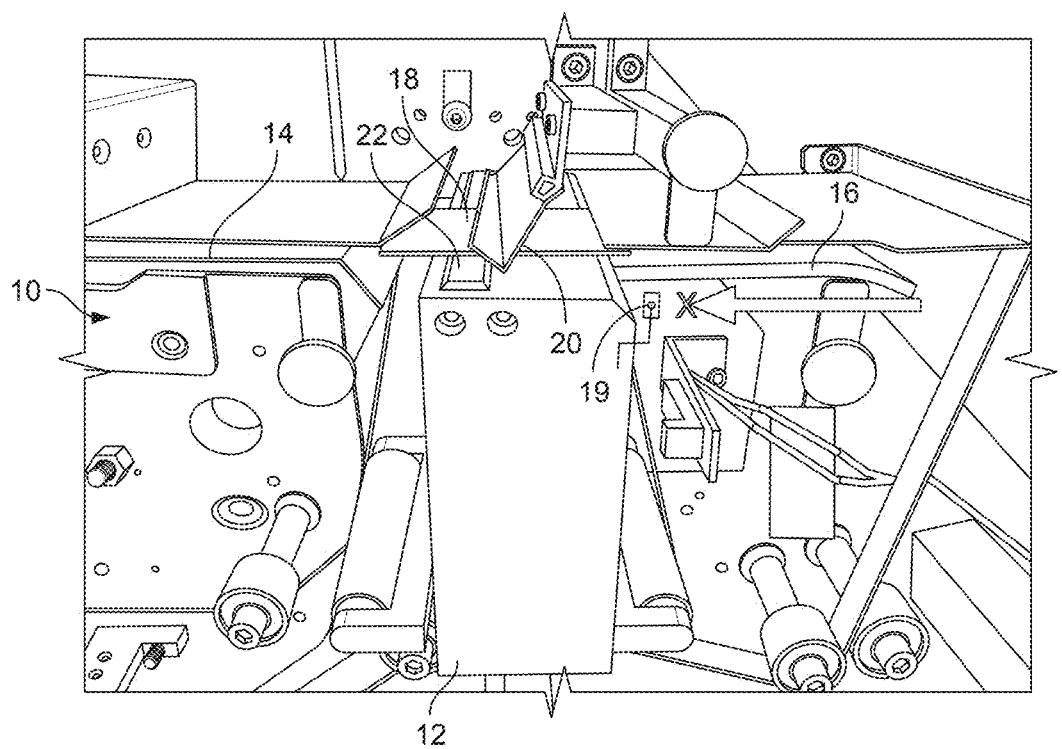
FIG. 1 shows a side view of part of a banknote processing machine.

A banknote handling machine 10 as shown in FIG. 1 incorporates a banknote recognition device 12 such that banknotes are fed in direction X to pass over sensors of device 12 to determine authenticity. Device 12 is located in a gap between aligned platforms 14, 16 along which individual notes 18 travel at speed with speed detected by an optional speed sensor 19. A single belt support and antistatic brush 20 ensure that banknotes freely pass over the top of sensor device 12.

Figure 2:
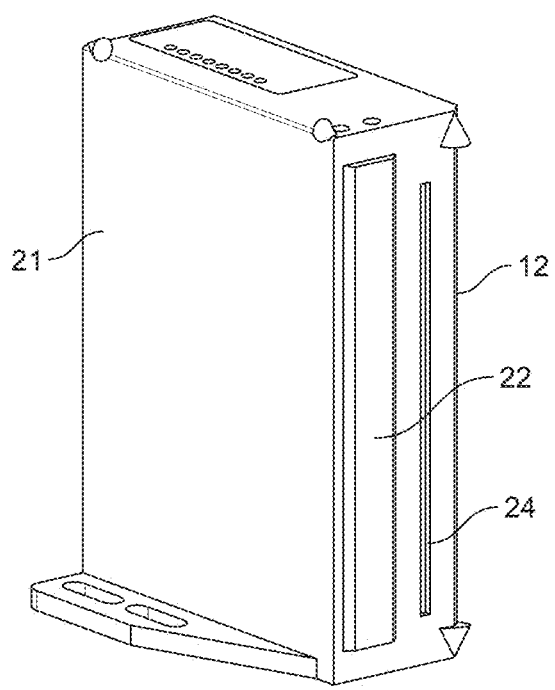
FIG. 2 shows a perspective view of a document recognition device.

Recognition device 12, see FIG. 2, comprises housing 21 within which is located magnetic field sensor 22 in the form of a plurality of tunnelling magneto-resistive (TMR) sensor elements to detect magnetic particles carried on banknotes, typically within a printed medium such as ink. The sensor elements of field sensor 22 are positioned proximal an external face of housing 21 so that note 18 is able to pass over device 12 and have magnetic field variation detected over the entire region of note 18. The magnetic sensing undertaken is used to generate an image of magnetic elements positioned on note 18 and so determine authenticity.

Recognition device 12 further comprises an optical edge detection sensor 24 such that device 12 can identify the start and end of each note 18 ready for collection of imaging data. Magnetic field sensor 22 acquires an image of magnetic features associated with note 18. Device 12 is able to identify and quantify soft and hard magnetic materials situated on banknotes so as to enable a pass/fail authenticity test. Generally device 12 is powered from a 8 to 24V input and has a digital interface to allow for data communication with external devices.

Figure 3:
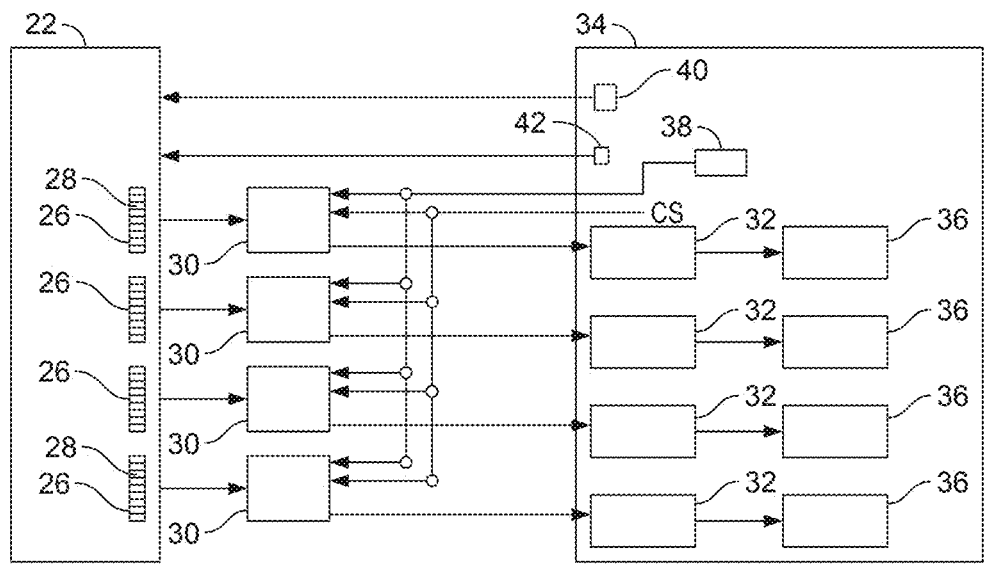
FIG. 3 shows a schematic diagram of a sensor and processing elements within the document recognition device.

As shown schematically in FIG. 3, magnetic field sensor 22 comprises four sets or channels 26 of forty eight sensor elements 28 (of which only eight of each set are shown), making 196 individual TMR sensor elements in total. Sensor elements 28 within sensor 22 are physically spaced from each other by a fixed node spacing so as to be regularly spaced apart, typically as a linear array. Sensor 22 generates an analogue voltage proportional to the magnetic field encountered which is then used to generate an image of the magnetic features of note 18. Thus each set 26 of forty eight sensor elements 28 transmits analogue data signals via an associated Analogue to Digital Converter (ADC) 30 and driver 32 to Random Access Memory (RAM) storage device 36 within a controller and data processor in the form of field programmable gate array (FPGA) 34 so that such a magnetic image can be created and stored. ADCs 30 and drivers 32 operate in parallel, such that each set 26 of sensor elements transmits data in parallel, with data from each set 26 written simultaneously into their respective RAM devices 36. FPGA 34 further comprises a clock unit 38 operating at 33 MHz to synchronise timings of the four ADCs 30 and also a reset signal 40 and increment signal 42 connected to sensor 22 and used to select in turn each sensor element 28 within each set 26.

Edge detector 24 comprises a plurality of LEDs which are associated with corresponding wavelength photo-transistors to create a sensor array. When a note edge begins to pass over edge detector 24, the signal received by the photo-transistors changes so as to indicate the commencement of the edge of a banknote. Controller 34 responds to detection of an edge to trigger data collection using magnetic field sensor 22. Edge detector 24 enables collection of an optical image of the entirety of banknote 18 if so desired, although the invention is in connection with the detection of magnetic images associated with a document of value such as a banknote, bond or card-like media.

Figure 4:
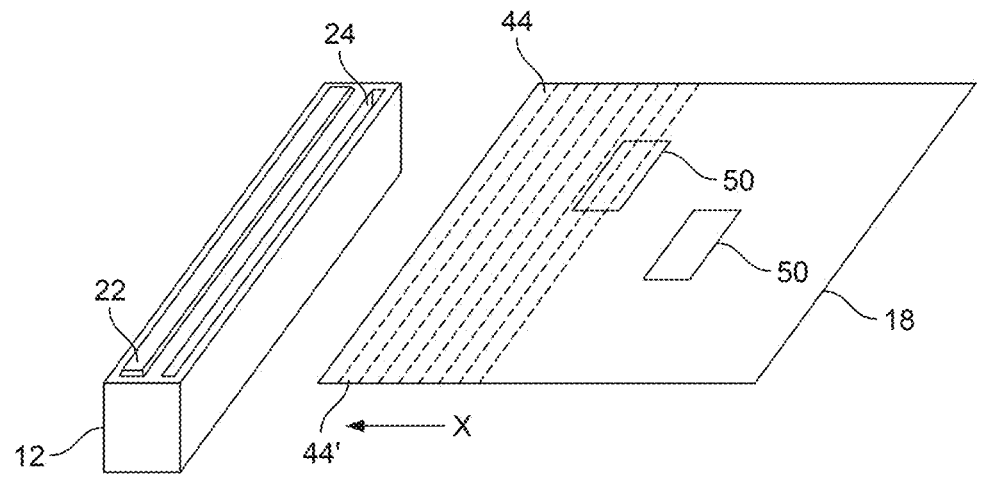
FIG. 4 shows a schematic diagram to illustrate processing of a banknote.

In use, notes 18 travel individually in the direction marked X between platforms 14 and 16 so as to move across sensors 22, 24 of device 12 which extend linearly perpendicular to the transport direction X, see FIG. 4. Each note 18 is continuously moving through machine 10 but at a much slower speed than the speed at which data acquisition takes place using sensor 22.

As note 18 moves over edge detector 24, the light detected by photo-transistors within the detector changes due to light from the LEDs reflecting off the note above until a signal threshold indicating an edge is present is met, at which point controller 34 is activated and data acquisition is triggered for magnetic field sensor 22 which reads the localised magnetic field for a strip 44 across the note, i.e. perpendicular to the direction of travel X.

After magnetic data has been read across a first strip 44 of note 18, reset signal 40 from FPGA 34 is paused for sufficient time to allow machine 10 to move note 18 such that the next adjoining strip 44' is then presented beneath sensor 22. The reset signal 40 resumes and the magnetic field data for the next strip is read. This continues for successive adjoining strips across the length of note 18 so that magnetic data is acquired for the entire area of note 18.

To ensure the data pixels of the acquired magnetic field data can be considered as being square, which greatly simplifies data processing, each strip 44 is configured to a width corresponding to the node spacing of sensor elements 28 within magnetic field sensor 22. This is achieved by ensuring that the time between successive readings by sensor 22 as triggered by FPGA 34 take place at spaced apart intervals that match the node spacing of sensor elements 28, the spaced apart intervals corresponding to the beginning of each strip 44.

After a first strip 44 of the note has been read and the magnetic data acquired, typically in a time of around 16 µs and thus substantially instantaneously as compared to the rate of travel of note 18, reset signal 40 is paused and sensor 22 enters a rest state as note 18 moves by a distance the same as the node spacing of sensor elements 28 within field sensor 22 before reset signal 40 resumes and a reading of the next adjoining strip 44' is undertaken. The regular physical spacing between successive sensor elements 28 as specified by the node spacing and the distance that each note moves between pauses in reset signal 40 are set at the same value, typically between 0.8 mm to 0.2 mm. Throughput of over 120 notes per second is achievable, representing speeds in excess of 30 m/s.

For a regular throughput speed, a speed value can be stored within FPGA 34 and used to control the timing of data acquisition by sensor 22, or supplied by a computer direct to FPGA 34. For a non-regular throughput, a physical speed sensor can be used to measure the speed of travel of notes 18 and to relay the speed to FPGA 34 can be used.

During reading of magnetic data from strip 44, each sensor element 28 within a channel 26 is read in turn based on signal 38 of frequency 3 MHz, such that each channel is simultaneously read in parallel to acquire and store the magnetic data.

Such a device 12 allows collection of a more refined magnetic image with increased speed of image detection and allows clearer imaging of hard and soft magnetic features over note 18.

In use when device 12 is switched on, FPGA 34 loads its configuration from flash memory and runs the LEDs within edge detector 24 in sequence to ensure firmware has correctly loaded and to test the LEDs. The array of sensor elements in optical edge detector 24 and the array of sensor elements in field sensor 22 are then read 16 times and the results divided by 16 (by right-shifting four) to create a calibration offset. There is one calibration offset for each node, i.e. each LED, of the optical array (sixteen nodes) and each node or TMR sensor element of the field sensor array (192 nodes). This is because there can be minor differences between the manufacturing tolerances of individual nodes, differences in the analogue circuitry between the LEDs and the ADCs, and differences between the ADCs themselves, such as reference voltage.

FPGA 34 repeatedly reads the sixteen nodes of edge detector 24 from 1 to 16. When a set number of optical nodes, for example five, have increased in value indicating an edge has been detected by optical edge detector 24, TMR sensor elements 28 begin to acquire data.

For any given note 18, the user assessing authenticity will know the location and configuration of magnetic features on an authentic note and data describing the location and characteristics of these Regions Of Interest (ROIs), see FIG. 4, is stored in non-volatile memory so that FPGA 34 can determine the authenticity or otherwise of each ROI on a note from the data values acquired during progress of note 18 across sensor 22. An ROI might span multiple RAM blocks. RAM 36 is configured as dual access, so the writing mechanism is asynchronous with the reading mechanism.

Where device 12 is configured to authenticate different denomination notes, then typically a switch is provided to select between authenticating, for example, a £5 or £10 note. Alternatively a denomination determination input is provided from a computer via USB or from an RS422/485/232 comms input from another source such as a camera module. If a note is authentic, then device 12 is configured to generate a signal indicating that field sensor 22 has determined the note to be authentic.

Where desired, a computer is connected to recognition device 12 to produce visual images of the magnetic scan, along with other diagnostic information relating to sensed magnetic field values. This also allows the user to draw a rectangle on the image to create a new ROI for uploading to device 12 and to supply the calculation method, thresholds and limit values to stipulate the pass criteria.

Figure 5:
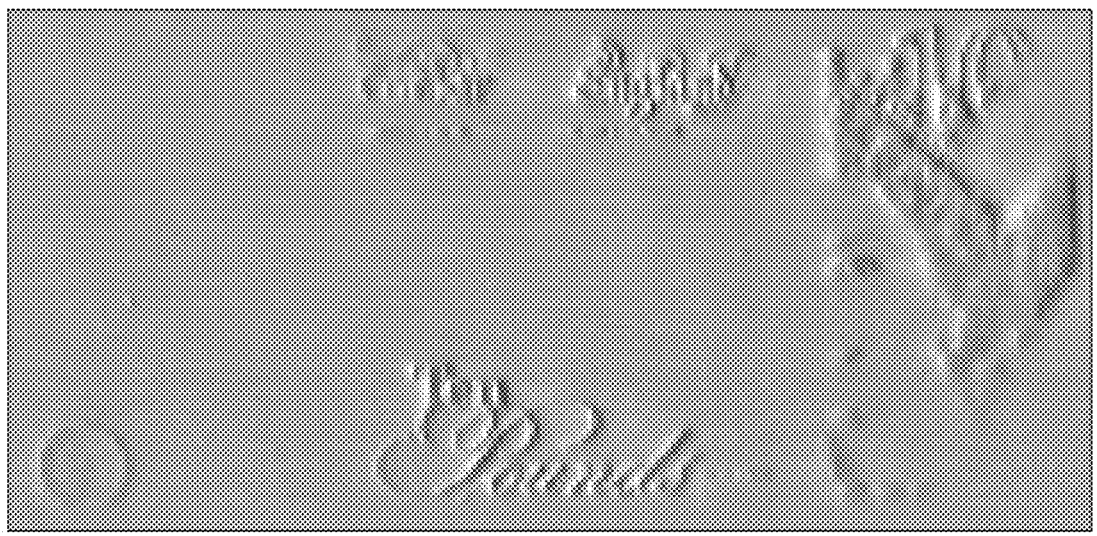
FIG. 5 shows an example of a magnetic image generated by the document recognition device.

FIG. 5 shows a typical soft magnetic visual image of a £10 note acquired by recognition device 12 at a note throughput speed of 6 m/s and shows the detail that can be achieved using such an arrangement. The technique of calibrating each individual node or sensor element helps further improve image quality over that already obtained by matching the regular physical spacing between sensor elements 28 to incremental movement of the note.

Figure 6:
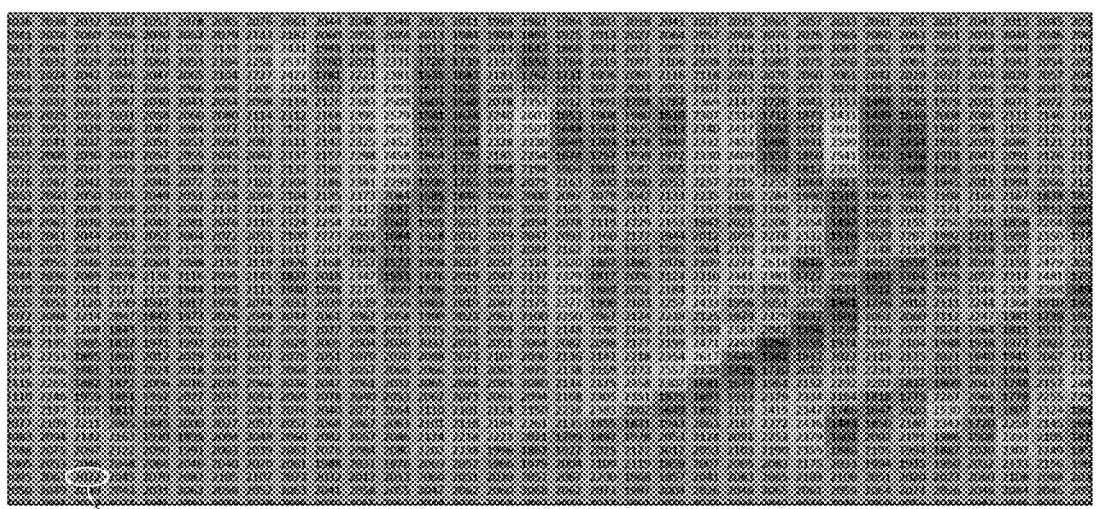
FIG. 6 shows a visual image of magnetic field variation over part of a banknote overlain with data information.

The magnetic field data acquired by TMR sensor elements 28 can be displayed in a spreadsheet and used to overlay the magnetic image with the individual pixel values showing strength of magnetic field according to which contrast of a grey scale image is altered or relative colouring such as a heat map introduced, see FIG. 6. For the image of FIG. 6 each cell holds the magnetic density value measured at that point, see for example cell 60 having a value of 2072 representing a low magnetic flux density region, and so it is possible to quantify the relative magnetic strengths of different areas.

The invention claimed is:

1. A document recognition device comprising a magnetic field sensor responsive to a controller to acquire magnetic field data from a document of value, wherein the magnetic field sensor comprises a plurality of sensor elements having a node spacing and the controller is configured to periodically activate the magnetic field sensor to acquire magnetic field data at regularly spaced intervals along a document of value, the spacing between each interval corresponding to the node spacing of the sensor elements and the magnetic field sensor entering an inactive state between successive intervals; and
   wherein the plurality of sensor elements are split into a plurality of equal groups and the controller is configured to process in parallel data acquired from each of the groups.

2. A document recognition device according to claim 1, wherein the plurality of sensor elements are arranged as a linear array orientated perpendicular to a direction of travel of a document of value over the magnetic field sensor.

3. A document recognition device according to claim 1, further comprising a housing, at least part of the magnetic field sensor located on an external face of the housing.

4. A document recognition device according to claim 1, further comprising an edge recognition sensor configured to trigger acquisition of magnetic field data by the controller.

5. A document recognition device according to claim 1, wherein the controller is a field programmable gate array.

6. A document recognition device according to claim 1, wherein the intervals are spaced apart by a constant distance between 0.8 mm to 0.2 mm.

7. A document recognition device according to claim 1, wherein the plurality of sensor elements have a node spacing of between 0.8 mm to 0.2 mm.

8. A document recognition device according to claim 1, wherein the sensor elements are TMR elements.

9. A document recognition device according to claim 1, further comprising a speed input device in communication with the controller.

10. A method of document authentication comprising passing a document of value over a magnetic field sensor responsive to a controller to acquire magnetic field data, the magnetic field sensor comprising a plurality of sensor elements having a node spacing, periodically activating the magnetic field sensor using the controller to acquire magnetic field data, wherein the controller is configured to periodically activate the magnetic field sensor to acquire magnetic field data at regularly spaced intervals along the document of value, the spacing between each interval corresponding to the node spacing of the sensor elements and the magnetic field sensor entering an inactive state between successive intervals,
   wherein the method further comprises configuring the plurality of sensor elements as four sections and processing in parallel magnetic field data from each of the four sections.

11. A method of document authentication according to claim 10, wherein the plurality of sensor elements are arranged as a linear array orientated perpendicular to a direction of travel of a document of value over the magnetic field sensor.

12. A method of document authentication according to claim 10, further comprising detecting an edge of a document of value using an edge detection sensor.

13. A method of document authentication according to claim 10, further comprising locating the magnetic field sensor on a housing such that the document of value remains external to the housing during acquisition of magnetic field data.

14. A method of document authentication according to claim 10, further comprising using an FPGA to store magnetic field data.

15. A method of document authentication according to claim 10, wherein the node spacing and the intervals are between 0.8 to 0.2 mm.

16. A method of document authentication according to claim 10, further comprising a calibration step, with a separate calibration applied to each sensor element.

* * * * *